Sept. 22, 1925.  
J. S. REYNOLDS  
1,554,523  
SCOOP CONTROL MECHANISM FOR SCRAPERS  
Filed Nov. 24, 1924  
3 Sheets-Sheet 1
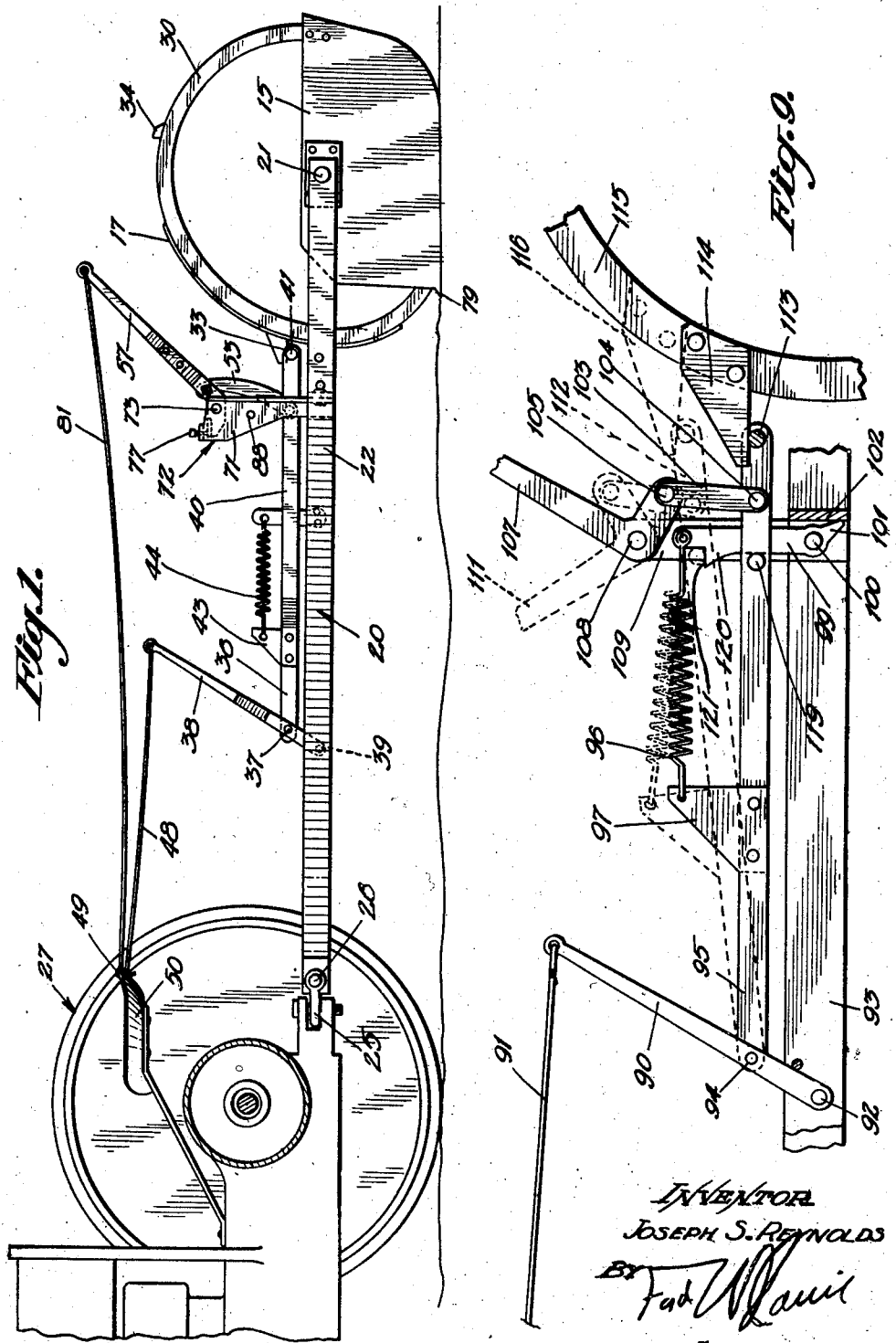
INVENTOR.  
JOSEPH S. REYNOLDS  
ATTORNEY

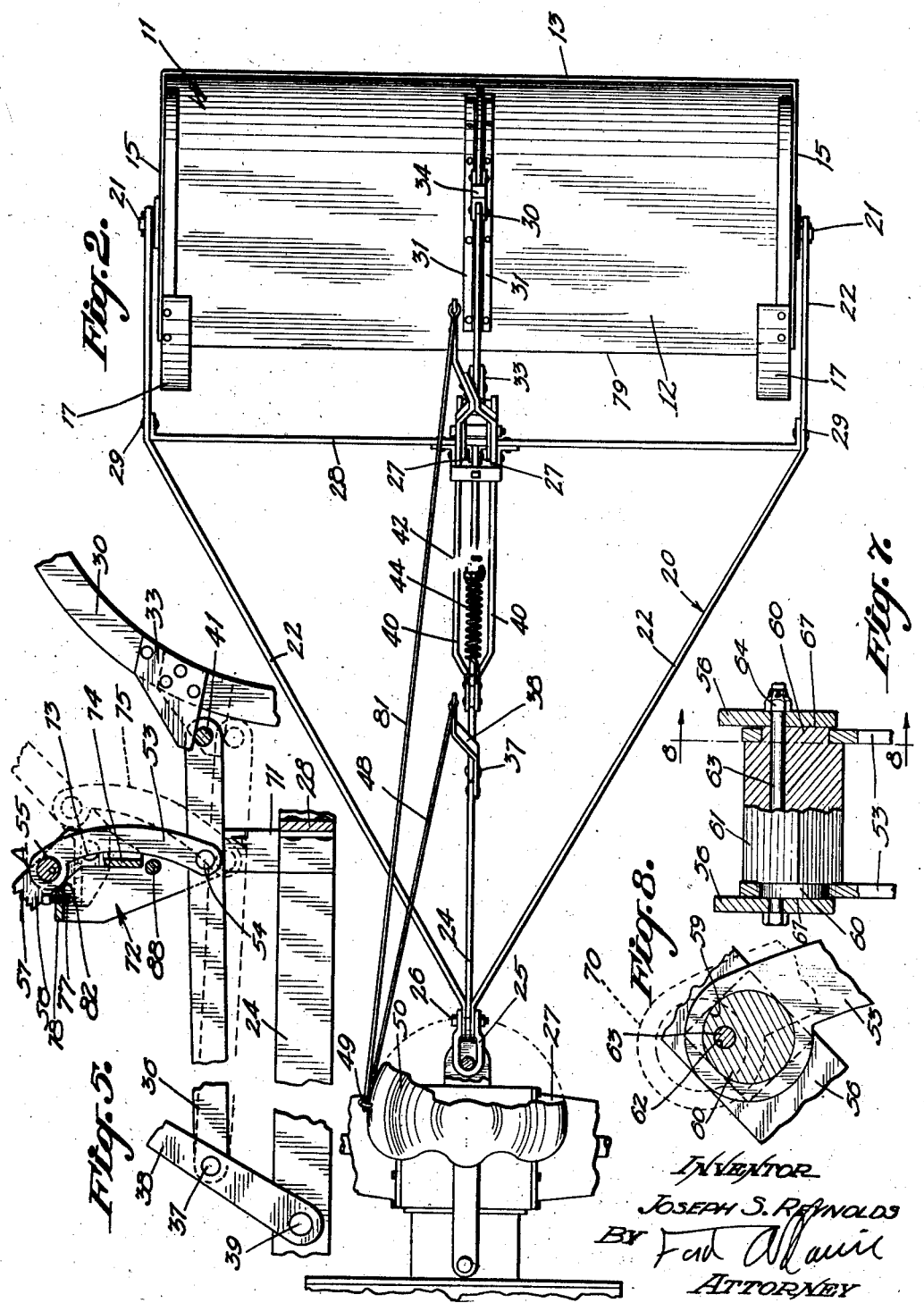

Sept. 22, 1925. 1,554,523
J. S. REYNOLDS
SCOOP CONTROL MECHANISM FOR SCRAPERS
Filed Nov. 24, 1924 3 Sheets-Sheet 3
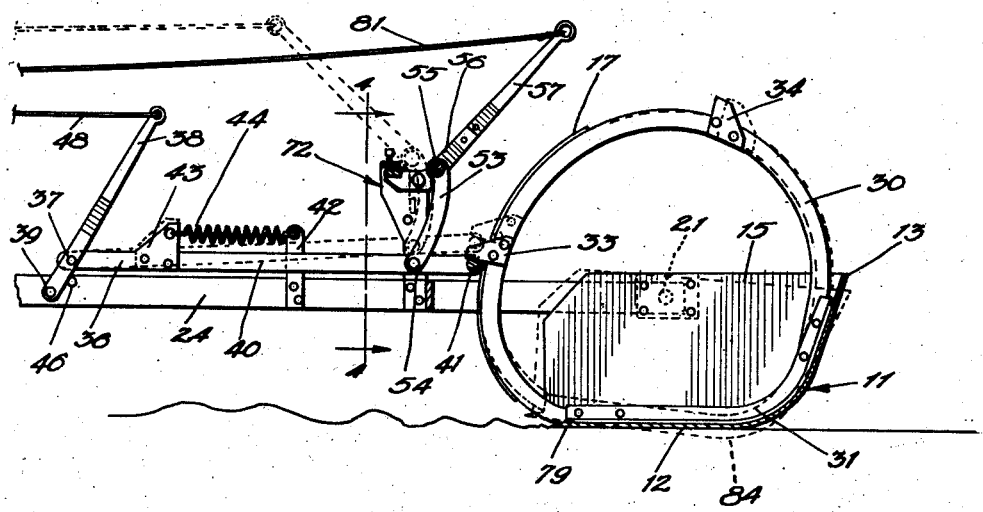
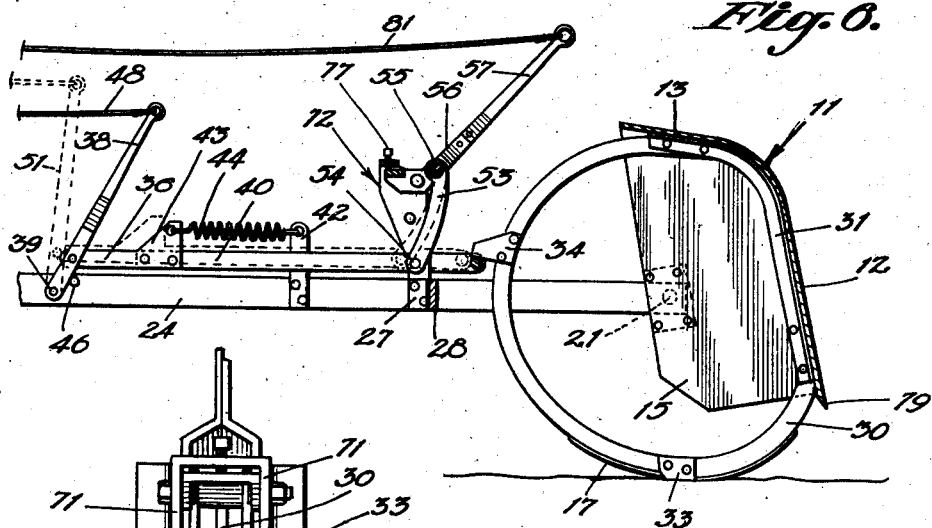
INVENTOR
JOSEPH S. REYNOLDS
BY
ATTORNEY Patented Sept. 22, 1925.

1,554,523

UNITED STATES PATENT OFFICE.

JOSEPH S. REYNOLDS, OF LOS ANGELES, CALIFORNIA.

SCOOP-CONTROL MECHANISM FOR SCRAPERS.

Application filed November 24, 1924. Serial No. 751,834.

*To all whom it may concern:*

Be it known that I, JOSEPH S. REYNOLDS, a citizen of the United States, residing at Los Angeles, in the county of Los Angeles and State of California, have invented a new and useful Scoop-Control Mechanism for Scrapers, of which the following is a specification.

This invention relates to scrapers such as are employed for leveling land and conveying dirt, and it relates particularly to control mechanism for operating the scoop of scrapers of this type.

The present scrapers generally comprise a revolving scoop having a bottom, back and sides. At the forward edge of the bottom, a cutting edge is provided, which is adapted for engagement with the surface of the ground to be leveled, for removing the upper layer of dirt. A draft frame is pivotally secured to the scoop by which the scoop is drawn along the ground, and mechanism is provided for operating the scoop. The scraper is drawn over the ground by a tractive vehicle with the cutting edge of the scoop in engagement with the ground and removing a ribbon of dirt. When the scoop is filled, the scoop operating mechanism is operated so as to remove the cutting edge from engagement with the ground, the scoop being moved from leveling position into carrying position. The scoop is then drawn to a suitable dumping place where the scoop mechanism is again operated and the scoop allowed to revolve and the dirt dumped.

It is an object of this invention to provide a scraper which is especially adapted to be pulled by a tractor.

It is another object of the invention to provide a scoop operating mechanism which is conveniently operated from the driver's seat of a tractive vehicle.

It is a still further object of the invention to provide a scoop control mechanism which is superior to other scoop controls by virtue of its simplicity to operate, reliability, sturdiness, and cheapness to produce.

My invention takes the form of a stop carried by the scoop of a scraper and a latch member carried by the frame, the latch member being arranged to engage the stop and to prevent a revolving of the scoop. An elevating means is provided which raises the latch member, which in turn raises the stop and removes the cutting edge of the scoop from engagement with the ground. A releasing means is associated with the latch member by which the latch member is released from engagement with the stop and the scoop allowed to revolve so that the dirt carried thereby may be dumped.

It is another object of my invention to provide a means for returning the latch member from elevated or carrying position to depressed or leveling position when the release means has been operated.

It is a further object of the invention to provide a means whereby the leveling position of the scoop may be regulated.

It is a still further object of the invention to provide a means whereby the carrying position of the scoop may be regulated.

It is also an object of this invention to provide a control mechanism having one central engagement with the scoop. This construction eliminates considerable mechanism and disadvantages of scrapers having plural engagement at the ends of the scoop. Those types of scrapers in which the scoop control mechanism engages with the scoop at the ends thereof, demand accurate adjustment and constant attention. If these engagements get out of adjustment or a preponderance of load is placed at one end of the scoop, one of the engagements will release before the other. This results in one of the cutting edges digging into the ground, and causes a distortion of the scoop which damages or deforms it permanently. It is obvious that with one central engagement of the control mechanism with the scoop that this will not occur.

Other objects and advantages of my invention will be made evident hereinafter.

Referring to the three sheets of drawings which are for illustrative purposes only, Fig. 1 is an elevational view of a scraper embodying the features of my invention.

Fig. 2 is a plan view of Fig. 1.

Fig. 3 is a longitudinal sectioned view showing more clearly the construction of my scoop control mechanism.

Fig. 4 is a fragmentary sectional view taken as indicated by the line 4—4 of Fig. 3.

Fig. 5 is an enlarged fragmentary view of the elevating organization of my invention.

Fig. 6 is a view similar to Fig. 3 but showing the scoop in spreading position.

Fig. 7 is an enlarged partially sectioned view showing the adjustment whereby the carrying position of the scoop may be varied.

Fig. 8 is a section taken as indicated by the line 8—8 of Fig. 7.

Fig. 9 is a fragmentary view illustrating an alternative form of my invention.

As shown in the drawing, the scraper employs a scoop 11 having a bottom 12 and a back 13, the bottom 12 and back 13 being provided from a single member which is bent as shown in the drawing. Sides 15 are secured at each end of the bottom and back, being secured thereto by suitable angle irons. Also at each end of the scoop 11, runners 17 are secured. A draft frame 20 is pivotally secured to the scoop 11 by means of trunnions 21 which are attached on the sides 15, these trunnions 21 having pins which extend through side bars 22 of the frame 20. Side bars 22 converge at the forward end thereof and conjunct with a central bar 24. A clevis 25 is secured to the forward ends of the bars 22 and 24 by a pin 26, this clevis 25 serving as a means for attaching the scraper to a tractive vehicle, which in this illustration is in the form of a tractor 27. The central bar 24 extends rearwardly and is secured by suitable angles 27 to a cross bar 28, this cross bar 28 in turn being secured at 29 to the side bars 22 of the frame 20.

A mounting bar 30 is secured at the center of the scoop 11 by angle irons 31, and attached to the mounting bar 30 are stops 33 and 34. A latch member 36 is pivoted at 37 to a releasing lever 38, the releasing lever 38 being in turn pivotally secured at 39 to the central bar 24 of the draft frame 20. The forward end of the latch member 36 bifurcates so as to provide a pair of parallel extending legs 40 which have secured at the extreme rearward end thereof, an engager pin 41. An arm 42 is secured to the central bar 24, and a plate 43 is secured to the latch member 36. A spring 44 connects between the plate 43 and arm 42 and serves to retain the latch member 36 in latching position, the engager pin 41 at this time being situated in the path of the stops 33 and 34, and the releasing lever 38 being retained against a stop pin 46 carried by the central bar 24. A flexible member in the form of a rope 48 is fastened at the upper end of the releasing lever 38 and extends forward, and is attached to the tractor at a place convenient for operation by the driver of the vehicle. In the drawings, I show the rope 48 attached at 49 to the seat 50 of the tractor 27. By pulling upon the rope 48, the releasing lever 38 is swung forward, as indicated by the dotted lines 51 of Fig. 6, and the latch member 36 is pulled forward against the action of the spring 44 in a manner to cause disengagement between an engaging stop 33 or 34 and the engager pin 41. When the rope 48 is released, the spring 44 returns the construction to its normal or latching position.

The rearward end of the latch member 36 is supported by a pair of links 53 which pivot at 54 to each of the legs 40 of the latch member 36. The upper end of the links 53 pivot at 55 to legs 56 of an elevating lever 57. As clearly shown in Figs. 7 and 8, the links 53 are pivoted so as to be adjustable relative to the elevating lever 57. The upper ends of the links 53 are provided with openings 59 into which bearing portions 60, formed at each end of a square block 61, extend. The block 61 is provided with an eccentric opening 62 through which a bolt 63 extends. The bolt 63, as shown in Fig. 7, also extends through the legs 56 of the elevating lever 57, and has a nut 64 screwed on the end thereof, this nut serving to clamp the legs 56 against the ends 67 of the bearing portions 60 so as to retain the block 61 in a permanent position in relation to legs 56. As shown in Fig. 8, the position of the links 53 is adjusted by loosening the nuts 64 and rotating the block 61 as by the application of a wrench on the squared portion thereof. The dotted lines 70 indicate the maximum adjustment of the link 53, the block 61 in this position being swung one-half a revolution on the bolt 62. This adjustment is provided for adjusting the carrying position of the scoop 11 and will be explained further as the description proceeds.

The elevating lever 57 is pivoted to legs 71 of a bracket 72 by means of pivots 73 which extend through the legs 56. The ends of the legs 56 extend a distance beyond the pivots 73 and have a bridge 74 extended thereacross. When the elevating lever is in the position shown by the full lines in Figs. 1, 2, 3 and 6 and shown by the dotted lines 75 of Fig. 5, the bridge 74 engages an adjustable stop in the form of a screw 77 which is threadably extended through a portion 78 of the bracket 72. When the elevating lever is in this position, the latch member 36 is in depressed position or in a position which permits the scoop 11 to rest in leveling position. As shown in Figs. 1 and 3, a cutting edge 79 formed at the forward edge of the bottom 12 engages with the surface of the ground and removes an upper layer therefrom when the scoop is in leveling position. By adjusting the position of the screw 77, the elevating lever 57 may be moved and the depressed position of the latch member may be regulated to vary the depth of the cut taken by the cutting edge 79 of the scoop 11.

A flexible member in the form of a rope 81 is secured at the upper end of the elevating lever 57 and extends forward, and is attached at 49 to the seat 50 of the tractor 27. The rope 81 is manually operated from the driver's seat. A pull on the rope 81 swings the lever 57 from the dotted line position 75 in Fig. 5 into the full line position. When in this position, the lever 57 engages a face 82 of the portion 78. The swinging of the lever 57 serves to elevate the latch member 36 from depressed position, shown in Figs. 1, 2, 3 and 6, into elevated position, as shown in full lines in Fig. 5 and in dotted lines in Fig. 3. When the latch member is in elevated position, the stop 33 is raised and the scoop 11 is moved in a manner to remove the cutting edge 79 from engagement with the ground, as indicated by the dotted lines 84 of Fig. 3, this position being considered as the carrying position of the scoop. As shown in Fig. 5, the points of pivot 55 of the links 53 with the legs 56 are swung to a point forwardly with respect to the pivots 73 of the legs 56 with the bracket 72. The weight placed on the lever 56 will then be in a direction indicated by the line A—A of Fig. 5, which is ahead of the pivot 73. It will be seen then that the weight transferred to the elevating lever 57 will serve to retain the lever in forward or elevating position.

Extending between the legs 71 of the bracket 72 is a returning pin 88 which is for the purpose of returning the latch member 36 to depressed position when the releasing lever 38 is operated. When the releasing lever 38 is operated, the latch member 36 is pulled forward. This brings the forward face of the links 53 into engagement with the returning pin 88. The links 53 will then fulcrum at the point at which they engage the pin 88, and the lever 57 will be swung rearward into the dotted position 75 of Fig. 5. It will be seen that without the provision of the pin 88, the links 53 would merely swing on the bearing portions 60 of the block 61, and the lever 57 would not be swung as it is with the provision of the returning pin 88. The returning pin 88 serves as an automatic means for swinging the lever without which it would be necessary to provide a separately operated means.

The operation of the device, just described, is substantially as follows:

Before the device is actually put in use, the carrying and leveling positions of the scoop are adjusted. The carrying position of the scoop is first adjusted; the lever 57 is swung into forward position, as shown in Fig. 5, and the bolt 63 is loosened so that the plug 61 may be rotated to move the links 53 so that the proper position of the latch member 36 may be obtained. The nut 64 is then tightened on the bolt 63, thus again rigidly securing the block 61 in place. The elevating lever 57 is then swung into rearward position, and the depressed position of the latch member 36 is regulated by adjusting the screw 77, as previously described. It is best to adjust the carrying position prior to the leveling position, as an adjustment of the leveling position would be thrown out of kilter if made previous to the adjustment of the carrying position.

The scraper is shown in leveling position in Figs. 1, 2 and 3 of the drawings. When in this position, the cutting edge 79 engages with the surface of the ground and removes an upper layer of earth therefrom. When the scoop 11 is filled with earth, the elevating lever 57 is swung into forward position by a pull upon the rope 81. This is very conveniently accomplished from the driver's seat of the vehicle, the driver merely reaching to the side and grasping the rope and exerting a forward pull thereon. This swings the scoop 11 into carrying position, as indicated by the dotted lines 84 of Fig. 3. To dump the dirt, the rope 48 is pulled in a manner to swing the releasing lever 38 into the dotted line position 51 of Fig. 6, thus moving the latch member 36 into releasing position which disengages the pin 41 with the stop 33 and permits the scoop 11 to revolve. If the dirt is to be dumped in a pile, as for making irrigation ridges, or the like, the releasing lever is retained in forward position until the second stop 34 has passed the pin 41. The lever is then released, and as the stop 33 swings around into the adjacency of the pin 41, it will be engaged thereby and the scoop again retained in leveling position. If it is desired to spread the earth over an area, the lever is pulled forward so as to allow the stop 33 to pass by the pin 41, but it is immediately released so that the pin 41 will engage the stop 34. This retains the scoop 11 in the position shown in Fig. 6. The earth will then be spread over the surface of the ground at a thickness equal to that of the distance between the cutting edge 79 and the surface of the ground. The latch member is automatically returned to depresed position, as previously described, when the releasing lever is actuated.

From the foregoing description, it will be recognized that the control mechanism of my invention is very simple and sturdy in its construction, and reliable in its performance. The mechanism is especially designed for convenience and ease of operation. All of the operations of the device are accomplished through the ropes 48 and 81 which are both readily actuated from the driver's seat. The novel adjustment of leveling and carrying position permits any depth of cut to be taken. The central engagement between the stops 33 and 34 and the latch member 36 is a feature of my invention. It is obvious that this arrangement will eliminate many of the difficulties encountered when engagement between the control mechanism and the scoop is provided at both ends of the scoop.

In Fig. 9 of the drawings, I show another form of my invention. In this form I employ a releasing lever 90 which is actuated by a rope 91. The lever 90 pivots at 92 to a central bar 93 on the draft frame of the scoop. At 94 there pivots a latch member 95 which is retained in latching position by a spring 96 which extends between a plate 97 and the upper end of a dog 99, this dog pivoting at 100 to the draft frame of the scraper. A toe 101 engages with a cross bar 102 of the frame to restrict the forward swinging of the dog 99 beyond a certain point. The rearward end of the latch member 95 is supported by a link 103 which pivots thereto at 104 and which also pivots at 105 to an elevating lever 107, this elevating lever 107 being pivoted at 108 to a bracket 109. When the elevating lever 107 is swung into the dotted line position 111 by means of a rope, not shown, the latch member is elevated into a position indicated by the dotted lines 112 of this figure. The engagement between an engaging pin 113 of the latch member 95, and a stop 114 which is secured on a mounting bar 115, moves the stop into a dotted line position 116 and serves to swing a scoop, not shown, to which the mounting bar 115 secures, into carrying position. When the latch member 95 is elevated, a pin 119 engages the diagonal face of a tooth 120, forcing the dog rearward and allowing the pin 119 to rest on the face 121 of the tooth 120, thus serving to retain the latch member 95 in elevated position. When the releasing lever 90 is pulled forward, the latch member 95 moves forward and the pin 119 disengages the tooth 120, and the latch member is permitted to return to depressed position, the latch member at this time also disengaging the stop 114 and permitting the scoop, not shown, to revolve.

I claim as my invention:

1. In a scraper, the combination of: a scoop; a draft frame pivoted to said scoop whereby said scoop is drawn along the surface of the ground; a central stop carried by said scoop; a central longitudinally movable latch member adapted for engagement with said stop to retain said scoop in a certain position; a releasing member pivoted to said draft frame, said releasing member having pivotal attachment with said latch member and being arranged for actuation in a manner to remove said latch from engagement with said stop; and means for raising said latch member to vary the position of said scoop.

2. In a scraper, the combination of: a scoop; a draft frame pivoted to said scoop whereby said scoop is drawn along the surface of the ground; a stop carried by said scoop; a latch member carried by said frame, said latch member being adapted for engagement with said stop to retain said scoop in a certain position; and means for regulating the vertical position of said latch member relative to said frame.

3. In a scraper, the combination of: a scoop; a draft frame pivoted to said scoop whereby said scoop is drawn along the surface of the ground; a central stop carried by said scoop; a central latch member adapted for engagement with said stop to retain said scoop in a certain position; a releasing member pivoted to said draft frame, said releasing member having pivotal attachment with said latch member and being arranged for actuation in a manner to remove said latch from engagement with said stop; and means for regulating the vertical position of said latch member.

4. In a scraper, the combination of: a scoop; a draft frame pivoted to said scoop whereby said scoop is drawn along the surface of the ground; a stop carried by said scoop; a releasing member swingably secured to said draft frame; a longitudinally movable latch member adapted to engage said stop to retain said scoop in a certain position, said latch member being pivoted to said releasing member and being removed from engagement with said stop when said releasing member is swung; and a means for giving vertical movement to said latch member in a manner to adjust the position of said scoop.

5. In a scraper, the combination of: a scoop; a draft frame pivoted to said scoop whereby said scoop is drawn along the surface of the ground; a stop carried by said scoop; a releasing member swingably secured to said draft frame; a latch member adapted to engage said stop to retain said scoop in a certain position, said latch member being pivoted to said releasing member and being removed from engagement with said stop when said releasing member is swung; and an elevating lever swingably supported by said frame, said elevating lever being connected with said latch member in such a manner that said latch member will be swung vertically when said elevating lever is swung relative to said draft frame.

6. In a scraper, the combination of: a scoop; a draft frame pivotally attached to said scoop; a stop mounted on said scoop;

a longitudinally movable latch member adapted to engage said stop and to thus retain said scoop in a leveling position; a releasing means supported by said draft frame to which said latch member connects, said releasing means being capable of actuation in a manner to remove said latch member from engagement with said stop, thus allowing said scoop to rotate; and an elevating means arranged to move said latch member so that said scoop will be moved into carrying position.

7. In a scraper, the combination of: a scoop; a draft frame pivotally attached to said scoop; a stop mounted on said scoop; a longitudinally movable latch member adapted to engage said stop and to thus retain said scoop in a leveling position; a releasing means supported by said draft frame to which said latch member connects, said releasing means being capable of actuation in a manner to remove said latch member from engagement with said stop, thus allowing said scoop to rotate; a link pivoted to said latch member; and an elevating lever pivoted to said draft frame, said elevating member being capable of being swung in a manner to elevate said latch member.

8. In a scraper, the combination of: a scoop; a draft frame pivotally attached to said scoop; a stop mounted on said scoop; a latch member adapted to engage said stop and to thus retain said scoop in a leveling position; a releasing means supported by said draft frame to which said latch member connects, said releasing means being capable of actuation in a manner to remove said latch member from engagement with said stop, thus allowing said scoop to rotate; a link pivoted to said latch member; an elevating lever pivoted to said draft frame, said elevating member being capable of being swung in a manner to elevate said latch member; and a returning pin, said returning pin being engaged by said link when said latch member is removed from engagement with said stop, in such a manner that said elevating lever will be swung so as to permit said latch member to return said scoop to leveling position.

9. In a scraper, the combination of: a scoop; a draft frame pivotally attached to said scoop; a stop mounted on said scoop; a latch member adapted to engage said stop and to thus retain said scoop in a leveling position; a releasing means supported by said draft frame to which said latch member connects, said releasing means being capable of actuation in a manner to remove said latch member from engagement with said stop, thus allowing said scoop to rotate; an elevating lever swingably supported by said draft frame; a link connecting between said elevating lever and said latch member, said latch member being moved by said link in a manner to move said scoop into carrying position when said elevating lever is swung; an adjustable stop engaged by said elevating lever for determining the depressed position of said latch member and thus control the leveling position of said scoop; and a permanent stop engaged by said elevating lever for determining the elevated position of said latch member and thus control the carrying position of said scoop.

10. A scraper as in claim 9 in which said link is adjustably connected to said elevating lever so that the elevated position may be varied and thus the carrying position of said scoop may be regulated.

11. In a scraper, the combination of: a scoop; a draft frame pivoted to said scoop whereby said scoop is drawn along the surface of the ground; a stop carried by said scoop; a longitudinally movable latch member carried by said frame, said latch member being adapted for engagement with said stop in order to retain said scoop in a certain position; and means for moving said latch member vertically relative to said frame.

12. In a scraper, the combination of: a scoop; a single draft frame pivotally attached to said scoop; a stop secured near the center of said scoop; a longitudinally movable latch bar located centrally with respect to said draft frame; and a releasing lever pivoted to said draft frame and to said latch bar.

13. In a scraper, the combination of: a scoop; a single draft frame pivotally attached to said scoop; a stop secured near the center of said scoop; a longitudinally movable latch bar located centrally with respect to said draft frame; a releasing lever pivoted to said draft frame and to said latch bar; and means for elevating the rearward end of said latch bar.

14. In a scraper, the combination of: a scoop; a single draft frame pivotally attached to said scoop; a stop secured near the center of said scoop; a longitudinally movable latch bar located centrally with respect to said draft frame; a releasing lever pivoted to said draft frame and to said latch bar; and means for elevating the rearward end of said latch bar relative to said frame.

15. In a scraper, the combination of: a scoop; a single draft frame pivotally attached to said scoop; a stop secured near the center of said scoop; a longitudinally movable latch bar located centrally with respect to said draft frame; a releasing lever pivoted to said draft frame and to said latch bar; an elevating lever pivoted to said frame; and a link extending between said elevating lever and said latch bar.

16. In a scraper, the combination of: a scoop; a single draft frame pivotally attached to said scoop; a stop secured near the center of said scoop; a longitudinally movable latch bar located centrally with respect to said draft frame; a releasing lever pivoted to said draft frame and to said latch bar; an elevating lever pivoted to said frame; and a link pivoted to said elevating lever and to said latch bar.

17. In a scraper, the combination of: a scoop; a single draft frame pivotally attached to said scoop; a stop secured near the center of said scoop; a longitudinally movable latch bar located centrally with respect to said draft frame; a releasing lever pivoted to said draft frame and to said latch bar; an elevating lever pivoted to said frame; and a link extending between said elevating lever and to the rear end of said latch bar.

18. In a scraper, the combination of: a scoop; a single draft frame pivotally attached to said scoop; a stop secured near the center of said scoop; a longitudinally movable latch bar located centrally with respect to said draft frame; a releasing lever pivoted to said draft frame and to said latch bar; an elevating lever pivoted to said frame; and a link pivoted to said elevating lever and to the rear end of said latch bar.

19. In a scraper, the combination of: a scoop; a single draft frame pivotally attached to said scoop; a stop secured near the center of said scoop; a longitudinally movable latch bar located centrally with respect to said draft frame; a releasing lever pivoted to said draft frame and to said latch bar; an elevating lever pivoted to said frame; an adjustable stop positioned to be engaged by said elevating lever; a permanent stop positioned for engagement by said elevating lever; a block having eccentric formations, said block being carried by said elevating lever; and links pivoted on said eccentric formations and to said latch bar.

20. In a scraper, the combination of: a scoop; a single draft frame pivotally attached to said scoop; a stop secured near the center of said scoop; a longitudinally movable latch bar located centrally with respect to said draft frame; a releasing lever pivoted to said draft frame and to said latch bar; an elevating lever pivoted to said frame; an adjustable stop carried by said frame and positioned to be engaged by said elevating lever; a permanent stop carried by said frame and positioned for engagement by said elevating lever; a block having an eccentric formation, said block being carried by said elevating lever; and a link pivoted on said eccentric formation and to said latch bar.

21. In a scraper, the combination of: a scoop; a single draft frame pivotally attached to said scoop; a stop secured near the center of said scoop; a longitudinally movable latch bar located centrally with respect to said draft frame; a releasing lever pivoted to said draft frame and to said latch bar; an elevating lever pivoted to said frame; adjustable stop positioned to be engaged by said elevating lever; a permanent stop positioned for engagement by said elevating lever; and means for connecting said elevating lever to said latch bar.

22. In a scraper, the combination of: a scoop; a single draft frame pivotally attached to said scoop; a stop secured near the center of said scoop; a longitudinally movable latch bar located centrally with respect to said draft frame; a releasing lever pivoted to said draft frame and to said latch bar; an elevating lever pivoted to said frame; an adjustable stop positioned to be engaged by said elevating lever; a permanent stop for engagement by said elevating lever; a block having an eccentric formation, said block being adjustably carried by said elevating lever; and a link pivoted on said eccentric formation and to said latch bar.

23. In a scraper, the combination of: a scoop; a single draft frame pivotally attached to said scoop; a stop secured near the center of said scoop; a longitudinally movable latch bar located centrally with respect to said draft frame; a releasing lever pivoted to said draft frame and to said latch bar; an elevating lever pivoted to said frame; an adjustable stop positioned to be engaged by said elevating lever; a permanent stop positioned for engagement by said elevating lever; a block having an eccentric formation, said block being rotatably carried by said elevating lever; and a link pivoted on said eccentric formation and to said latch bar.

24. In a scraper, the combination of: a scoop; a single draft frame pivotally attached to said scoop; a stop secured near the center of said scoop; a longitudinally movable latch bar located centrally with respect to said draft frame; a releasing lever pivoted to said draft frame and to said latch bar; an elevating lever pivoted to said frame; an adjustable stop to be engaged by said elevating lever; a permanent stop positioned for engagement by said elevating lever; a block having an eccentric formation, said block being carried by said elevating lever in such a manner as to be capable of setting so as to vary the position of said eccentric formation relative to said elevating lever; and a link pivoted on said eccentric formation and to said latch bar.

25. In a scraper, the combination of: a scoop; a single draft frame pivotally attached to said scoop; a stop secured near the center of said scoop; a longitudinally movable latch bar located centrally with respect to said draft frame; a releasing lever pivoted to said draft frame and to said latch bar; an elevating lever pivoted to said frame; a block having an eccentric formation carried by said elevating lever, said block being capable of setting to vary the position of said eccentric formation relative to said elevating lever; and a link pivoted on said eccentric formation and to said latch bar.

In testimony whereof, I have hereunto set my hand at Los Angeles, California, this 18th day of November 1924.

JOSEPH S. REYNOLDS.